May 3, 1960  G. J. DUFF  2,934,847
HOOK SETTING DEVICE
Filed March 15, 1957  3 Sheets-Sheet 1
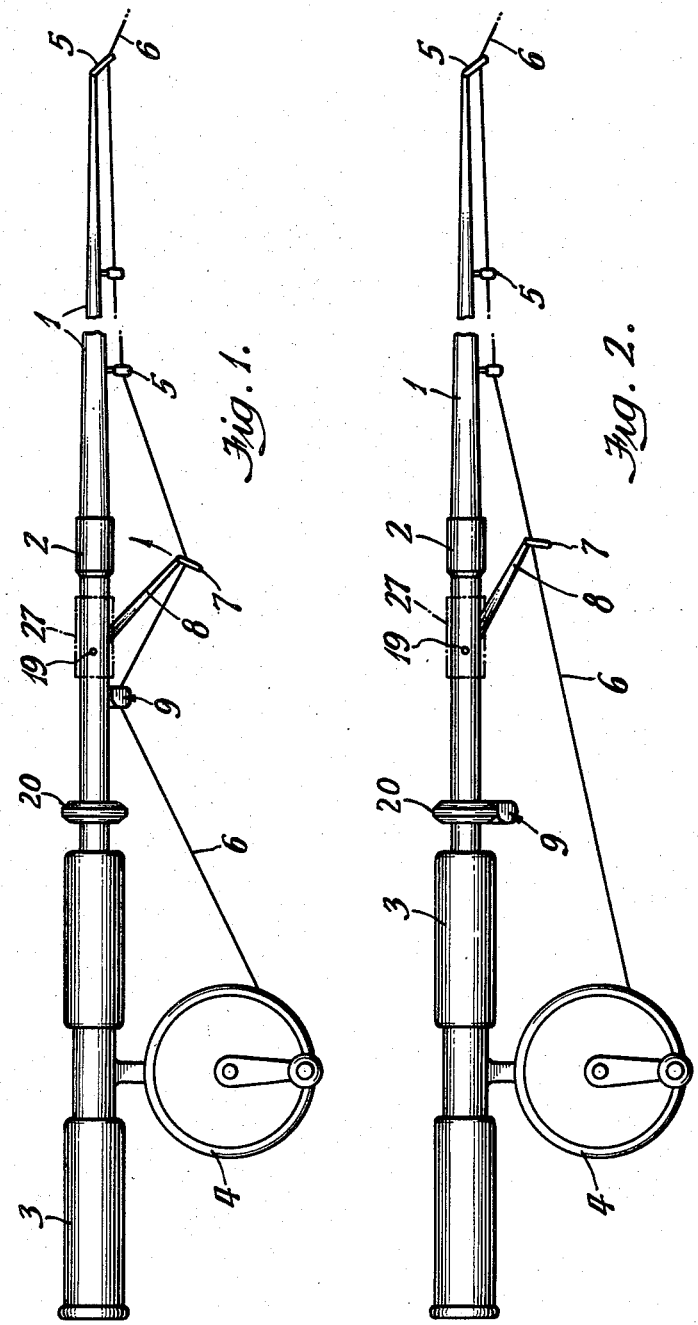
INVENTOR:
GERALD JOSEPH DUFF May 3, 1960
G. J. DUFF
2,934,847
HOOK SETTING DEVICE
Filed March 15, 1957
3 Sheets-Sheet 2
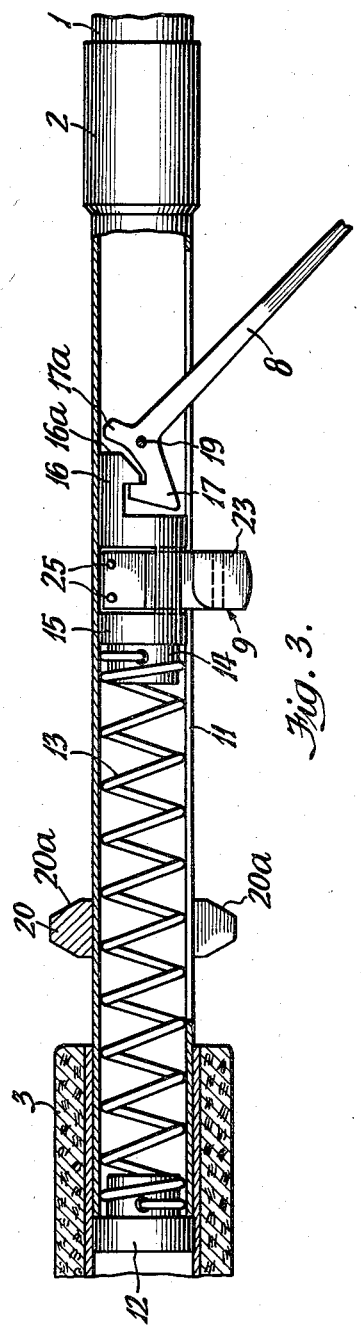
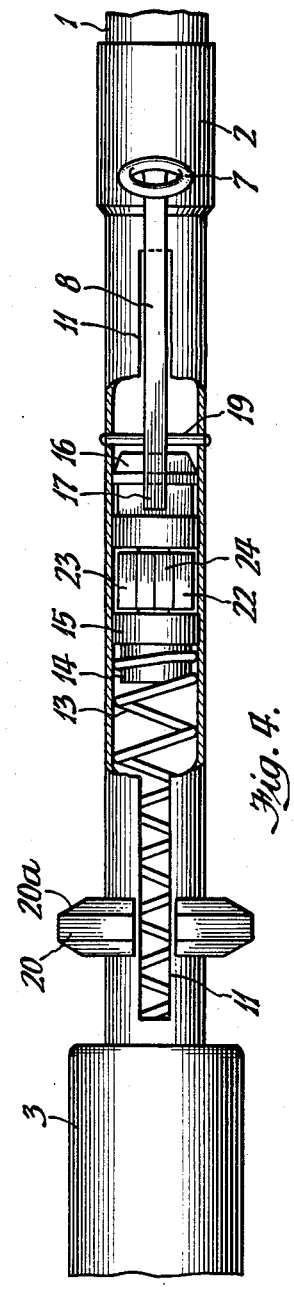
INVENTOR:
GERALD JOSEPH DUFF
By: Townsend Beaman
ATTY May 3, 1960 G. J. DUFF 2,934,847
HOOK SETTING DEVICE
Filed March 15, 1957 3 Sheets-Sheet 3

INVENTOR:
GERALD JOSEPH DUFF
BY: Townsend R Beaman
ATTY

United States Patent Office 2,934,847
Patented May 3, 1960

2,934,847

HOOK SETTING DEVICE

Gerald Joseph Duff, Brighton, Victoria, Australia

Application March 15, 1957, Serial No. 646,421

Claims priority, application Australia March 20, 1956

2 Claims. (Cl. 43—15)

This invention relates to the art of fishing, using a line attached lure adapted to be manually cast into the water to attract and hook a fish.

With fishing gear of the type at present available, the angler is required to attain considerable skill for the hooking of certain species of fish if the catch is to be commensurate with the time spent in angling, particularly when the fish are scarce.

The principal object of the present invention is to provide means for inclusion with the fishing tackle, either hand or rod operated, whereby less experienced anglers may hook a fish with a greater degree of certainty, responsive to the latter attacking or taking the lure.

With the above stated object in view the present invention provides means for the hooking of fish comprising in combination a support, a carriage resiliently connected to the support and capable of being spring biased relative to said support, a pair of line gripping members movable relatively to one another and slidably mounted within the carriage, a release member mounted upon said support for movement relative thereto in response to tensioning on the line, and a line releasing member provided on the support to engage the line gripping members when the carriage is in the fully retracted position, whereby upon tensioning of the line in response to a fish attacking an attached lure the carriage resiles to the fully retracted position imparting a sharp pull to the line to effect hooking of the fish and the line is released from the gripping members to allow the former to be wound upon a reel.

The shaft may comprise the complete fishing rod or means upon which the fishing line may be wound.

In use, an angler upon casting the line with a baited hook or attached lure, effects the attachment of the line to the resilient line attachment member and tensions the latter in a "set" position for automatic release. In response to an attack by a fish the line attachment member is automatically released in a snap action so as to suddenly and sharply retract the line thereby causing the lure to strike immediately with the object of hooking the fish, whereupon the latter may be reeled or pulled in the usual manner.

One practical arrangement of the invention will now be described with reference to the accompanying drawings in which:

Figure 1 is a side elevational view of the means for hooking fish, as incorporated in, or mounted upon a fishing rod having an attached reel, and illustrating the tensioned or loaded position of the resilient line attachable member.

Figure 2 is a view corresponding to Figure 1 and illustrating the retracted or released position of the apparatus.

Figure 3 is a fragmentary elevational view partly sectioned of the device incorporated in the fishing rod illustrated in Figure 1.

Figure 4 is a bottom plan view partly sectioned of the mechanism illustrated in Figure 3.

Figure 5:
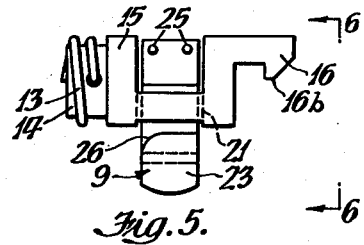
Figure 5 is a side elevational view of the carriage and the line attachment member illustrated in the closed position.

Referring now to Figures 1 and 2 of the accompanying drawings a fishing rod incorporating the apparatus comprises a two piece shaft 1 joined by a furrule 2 and fitted at one end with a hand grip 3 upon which a line reel 4 is detachably mounted. A number of line guides 5 and a fixed line guide 5a guide the line 6 from the reel 4 along the shaft 1.

A further line guide 7 attached to the outer end of a release arm 8 engages the line 6 in advance of a resiliently mounted line attachment member generally designated by the reference number 9 so that the line may be tensioned and held in the position shown in Figure 1.

Upon release of the spring biased line attachment member 9 by angular movement of the release member 8 in the direction of the arrow (Figure 1) in response to an attack on the lure by a fish tensioning the line, the line attachment member 9 is sharply retracted toward the handle 3 to set the hook and engagement of the member 9 with a collar 20, releases the line from member 9 to permit the line to be reeled in.

The resiliently mounted line attachment member 9 and the associated release arm mechanism are illustrated in Figures 3 and 4, a partially sectioned side elevational view and a bottom plan respectively showing the device in the loaded or cocked position.

The inner end of the shaft 1 to which the hand grip 3 is attached comprises a hollow relatively thin walled tube having a longitudinal slot 11 extending substantially throughout its length.

A plug 12 secured within the inner end of the shaft 1 provides an anchor for one end of a helical tension spring 13. The other end of the spring 13 is secured to a complementary projection 14 formed integrally with one end of a carriage 15 adapted to slide within the hollow shaft 1.

The opposite end of carriage 15 is formed with a detent 16 which is engaged by a detent 17 formed on the release or trip arm 8. Arm 8 is pivotably mounted to shaft 1 by a pin 19 and extends through the slot 11. Thus, the engagement of detents 16 and 17 will maintain spring 13 in a tensioned condition.

A lug 17a (Figure 3) angularly disposed adjacent the detent 17 and integrally formed with the release arm 8 provides an abutment against which the end 16a of the complementary detent 16 engages to ensure automatic loading by engagement of the detents 16 and 17 irrespective of the relative position of the fishing rod.

Angular movement of the release arm 8 about its pivot 19 causes the inter-engaging detents 16 and 17 to disengage whereupon the carriage is sharply retracted or impulsed towards the hand grip end of the shaft 1.

Slidably retained within the carriage 15 for radial displacement relatively to the shaft 1 and projecting out through the slot 11 is a line attachment member 9 which is decribed below.

A collar 20 having a forwardly directed annular inclined face 20a is affixed to the shaft 1 at the inner termination of the slot 11. The collar 20 is slotted at its normally lower portion to accommodate lower portions of the line attachment member 9 as seen in Figs. 2 and 4 for reasons which will be explained below.

Referring now to Figures 5 to 8, the carriage 15 comprises a cylindrical member reduced in diameter at its inner end to form the above-mentioned projection 14 for the spring 13. The outer end of the cylindrical member is adapted to provide a horizontally disposed transverse detent 16 such that the engaging portion 16b has a transverse dimension substantially equal to the diameter of the said carriage.

Centrally disposed within the carriage 15 and housed within a vertically disposed slot 21 formed in the latter is a line engaging member 9 comprising a pair of symmetrically juxtaposed elements 22 and 23 having an upper thin portion adapted for clearance for slidable engagement within the above-mentioned slot 21 and the slot 11 of the shaft 1. The lower ends of the elements 22 and 23 are laterally and downwardly deformed so as to provide an inner space within which a substantially U shaped resilient line gripping member 24 is secured by attaching the respective arms of said member to the upper ends of the elements 22 and 23.

Figure 6:
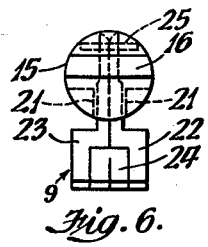
Figure 6 is an end elevation of the line carriage and the attachment member viewed from the plane 6—6 in Figure 5.
Figure 7:
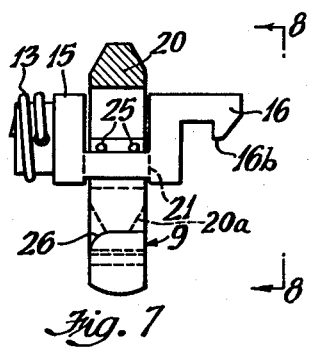
Figure 7 is a side elevational view of the carriage, collar and the line attachment member illustrated in the open position.
Figure 8:
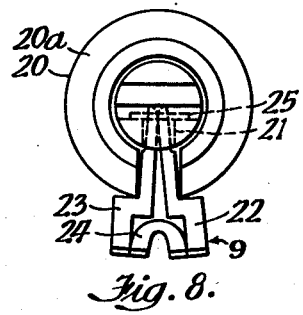
Figure 8 is an end elevation of the carriage, collar and the line attachment member viewed from the plane 8—8 in Figure 7.

The upper ends of the elements 22 and 23 are inwardly chamfered and loosely connected by a pair of retaining pins 25, the said ends being further reduced laterally to permit the adjacent inner faces of the elements 22 and 23 to separate upon downward vertical displacement of the line attachment member 9 with respect to carriage 15 as viewed in Figs. 5–8. The lower side walls of the carriage 15 adjacent the slot 21 are removed as shown in Figure 5 to accommodate the retaining pin 25 and limit vertical displacement and resultant opening of the resilient line gripping member 24 as shown in Figures 7 and 8.

The abovementioned vertical displacement of the line attachment member 9, i.e. the complementary elements 22 and 23 and the connecting line gripping member 24, is effected upon retraction of the carriage 15 under the influence of the tension spring 13 by the engagement of the rounded rearward corner 26 shown in Fig. 17, of the elements 22 and 23 with the inclined face 20a of the collar 20 at the fully retracted position of the carriage.

In the operation of the above-described fishing rod, after casting the lure into the water, the line attachment member is manually displaced along the shaft 1 against the resistance of the tension spring 13 until the detent 16 of the carriage engages the complementary detent 17 of the release arm 8 whereupon the carriage is retained in the loaded or set position shown in Fig. 3. The line is then placed between the resilient faces of the line gripping member 24 and the latter is closed together to pinch and thereby grip the line. The elements 22 and 23 are then moved radially toward carriage 15, further into slot 21, which holds the elements 22 and 23 in contact and maintains the grip on the line, this relation is shown in Figs. 5 and 6. The path of the line extends from the reel 4, between the resilient faces of the line gripping member 9 through the line guide 7 at the outer end of the release arm 8, and thence through the line guides 5 attached to the shaft 1.

In response to the tensioning of the free line as by an attack on the lure by a fish, the line, being firmly held in the line gripping member 9 rearwardly of the release arm 8 and divergently displaced between the line gripping member 9 and the adjacent fixed line guide 5 by the outer end of the said release arm 8, in tending to straighten responsive to the applied tension, causes the release arm to be moved angularly about its pivot thereby disengaging the detents 16 and 17 and permitting the line gripping member and the attached line to be sharply pulled toward hand grip 3 by the influence of the tension spring 13.

As the carriage 15 moves toward the grip 3 the line 6 will be jerked and the fish will be hooked. Upon the carriage 15 reaching the position of Fig. 2 the rounded corners 26 of elements 22 and 23 will engage inclined face 20a of collar 20 which will radially pull the elements downward to the positions shown in Figs. 7 and 8 and the resilient nature of gripping member 24 will push elements 22 and 23 apart as reduced portions of the elements adjacent pins 25 will now be within slot 21 and the line will be released, note Fig. 8, permitting the line to be reeled. The above described operation will be understood from Fig. 8, wherein it will be observed that it is the portion of surface 20a adjacent the slot formed in collar 20 which engages the corner 26 of elements 22 and 23 to move the elements radially downwardly, and that the inclination of surface 20a and the radius of corner 26 will very quickly move the elements within the slot 21 from the position of Fig. 6 to the position of Fig. 8. As the enlarged portions of elements 22 and 23 within the slot 21 are only slightly less, in combined width, than the slot itself, when the elements are in the uppermost position shown in Fig. 6, the slot 21 will keep the elements closed and maintain the grip on the line. When the elements 22 and 23 are moved downwardly, as in Fig. 8, the reduced portion of the elements will be located within slot 21, which provides clearance to permit the elements to separate and release the line.

Figures 9 to 14 illustrate a combined safety catch and rod conversion member to prevent accidental release of the mechanism and for the purpose of converting the rod for normal angling by rigidly securing the release arm 8 and the attached guide 7 against the shaft 1 for use as a fixed line guide.

The safety catch and conversion member comprises a cylindrical sleeve 27 encircling the shaft 1 adjacent the pivotally mounted release arm 8, suitable circumferential clearance being provided to permit relative rotation of the sleeve upon the shaft.

An internal centrally disposed circumferential groove 28a provided within the wall of the safety catch sleeve 27 accommodates the outer ends of the release arm pivot pin 19 thereby preventing axial displacement of the later. The engagement of the outer ends of the said pivot pin 19 in the circumferential groove 28a further prevents longitudinal displacement of the safety catch sleeve 27 relatively to the shaft 1.

A longitudinally disposed slot, shown by the arrowhead at 28 extending the length of the sleeve 27 and of a width corresponding to that of the slot 11 in the shaft 1 has at one end, a portion of its length laterally widened to twice that of the first-mentioned width and at the other end an oppositely directed laterally widened portion of similar width. Thus a narrow central portion is provided which when aligned to overlie the slot 11 in the shaft 1, as in Fig. 13, permits operation of the device in the manner described above and which when rotated about the shaft 1 in one direction so as to cause a portion of the sleeve 27 to overlie the release arm rearwardly of its pivot 19, as in Figures 11 and 12, prevents disengagement of the detents 16 and 17 and consequently release of the carriage 15 cannot be accidently effected.

Figure 9:
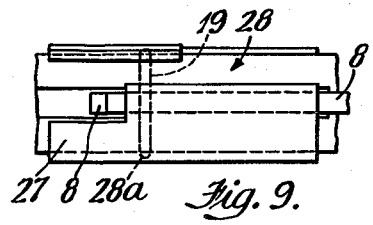
Figure 9 is a bottom plan view of a portion of the device incorporated in a fishing rod and illustrating a combined safety catch and rod conversion member positioned to convert the release arm to an ordinary fixed runner.
Figure 10:
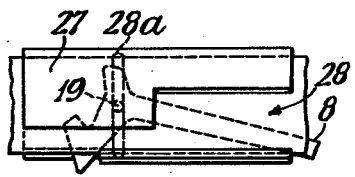
Figure 10 is a side elevational view of the device shown in Figure 9 showing the release arm positioned for use as a fixed runner.
Figure 11:
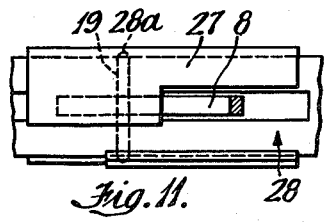
Figure 11 is a view similar to Figure 9 and illustrating the safety catch member in the "on" position.
Figure 12:
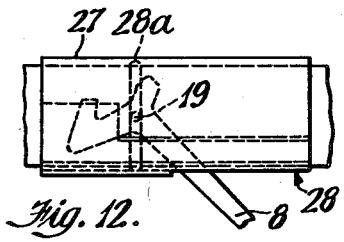
Figure 12 is a side elevational view of the device shown in Figure 11 showing the release arm member locked in the safety "cocked" position.
Figure 13:
Figure 13 is a view similar to Figure 9 and illustrating the safety catch member in the "off" position.
Figure 14:
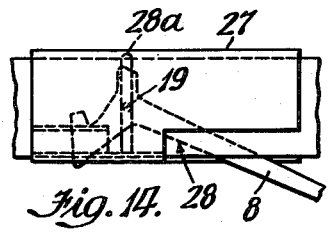
Figure 14 is a side elevational view of the device shown in Figure 13 showing the release arm member in the release position.

To convert the rod from the above-described automatic arrangement for use as an ordinary angling rod the sleeve 27 is rotated upon the shaft 1 in the opposite direction to that described above to cause a portion of the sleeve to overlie the release arm 8 in advance of its pivot 19 as shown in Figures 9 and 10, whereby the said release arm is securely clamped against the shaft 1 permitting the guide 7 to be utilized as an ordinary fixed line guide.

What I claim is:

1. Means for the hooking of fish comprising in combination a fish line, a support, a carriage mounted on said support movable between a first position and a second position thereon, releasable locking means mounted on said support for maintaining said carriage in said first position, spring means interposed between said support and carriage tending to move said carriage from said first position to said second position, a line gripping member mounted on said carriage having a pair of line gripping elements radially movable relative to said carriage between line gripping and line releasing positions, respectively, means for maintaining said elements in said line gripping position at said first postion of said carriage and a cam mounted on sad support adapted to engage said elements when the carriage is in said second position and to effect said radial movement of the elements relative to the carriage to the line releasing position and means operatively connected to said locking means and operable in response to tensioning of the fish line whereby a predetermined tension on the line will release said locking means permitting said carriage to be moved from said first to said second position.

2. Means for the hooking of fish as in claim 1, wherein the means operable in response to the tensioning of the line comprises a release arm operatively associated with said locking means and pivotally mounted upon and projecting from the support and so disposed to hold the line in a laterally divergent path relative to the normal path of the line, whereby upon tensioning of the line the release arm is angularly moved to thereby release the locking means, and having a safety catch mounted on said support and selectively movable relative thereto to engage said locking means so as to prevent angular movement of the release arm and a resultant accidental release of the line gripping members.

References Cited in the file of this patent

UNITED STATES PATENTS

| | | |
|---|---|---|
| 2,177,912 | Spitz et al. | Oct. 31, 1939 |
| 2,590,721 | Muth | Mar. 25, 1952 |
| 2,694,875 | Hoffmann | Nov. 23, 1954 |
| 2,696,692 | Zeilinski | Dec. 14, 1954 |